Patented Mar. 2, 1943

2,312,701

UNITED STATES PATENT OFFICE 2,312,701

TRIAZINE DERIVATIVES

Gaetano F. D'Alelio, Pittsfield, Mass., assignor to General Electric Company, a corporation of New York No Drawing. Application December 19, 1941,
Serial No. 423,691

15 Claims. (Cl. 260—248)

This invention relates to new chemical compounds and more particularly to triazine derivatives. The invention especially is concerned with the production of new and useful triazinyl hydroxycarbocyclic-carbamyl-alkyl sulfides and triazinyl hydroxycarbocyclic-thiocarbamyl-alkyl sulfides.

The triazine derivatives of this invention may be represented graphically by the following general formula:

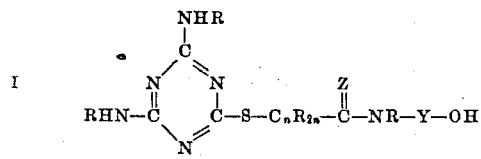

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halohydrocarbon radicals. Since $n$ represents an integer which is 1 or 2, it will be seen that the linkage of the hydroxycarbocyclic-carbamyl-alkyl or hydroxycarbocyclic-thiocarbamyl-alkyl grouping to the sulfur atom in all cases will be alpha or beta to the hydroxycarbocyclic-carbamyl or -thiocarbamyl grouping. It also will be observed that linkage of the triazinyl grouping to the sulfur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homolgues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, etc. Preferably R in Formula I is hydrogen. However, there also may be produced in accordance with the present invention compounds such, for instance, as those represented by the general formulas:

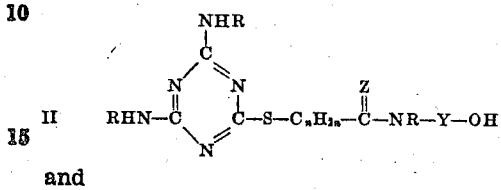

and

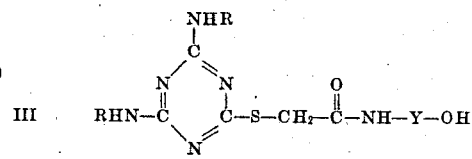

where $n$, Z, Y and R have the same meanings as above given with reference to Formula I.

Illustrative examples of divalent carbocyclic radicals which Y in Formulas I, II and III may represent are: divalent, aromatic, e. g., phenylene, xenylene, naphthylene, etc.; divalent aliphatic-substituted aromatic e. g., 2,5-tolylene, para-(2,3-xylylene), etc.; divalent cycloaliphatic, e. g., cyclopentylene, cyclohexylene, cyclopentenylene, cyclohexenylene, cycloheptylene, etc.; and their homologues, as well as those divalent carbocyclic radicals with one or more of their hydrogen atoms replaced by a substituent, e. g., halogeno, amino, acetyl, acetoxy, carboalkoxy, alkoxy, aryloxy, sulfamyl, alkyl, alkenyl, a hydroxy group or groups in addition to the single —OH group shown in the above formulas, etc. Specific examples of substituted divalent carbocyclic radicals are chlorophenylene, bromophenylene, chloronaphthylene, bromonaphthylene, bromo 2,5-tolylene, chlorocyclopentylene, chlorocyclopentenylene, carbomethoxyphenylene, ethoxyphenylene, acetophenylene, acetoxyphenylene, bromocyclopentylene, aminophenylene, phenoxyphenylene, sulfamylphenylene, methylphenylene (tolylene), allylphenylene, etc. Preferably Y is phenylene or methylphenylene.

The new compounds of this invention may be used, for example, as pharmaceuticals, plasticizers and as intermediates in the preparation of derivatives thereof such as hydrazo, hydrazino, carbazido, semicarbazido, ureido, carbamyl, acyl, amidine, methylol, etc., derivatives of the individual compound embraced by Formula I. These new organic sulfides are especially valuable in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and are specifically claimed in my copending application Serial No. 424,330, filed December 24, 1941, and assigned to the same assignee as the present invention. These new organic sulfides also may be compounded with rubber, both natural and synthetic, to modify the properties of the rubber.

Various methods may be employed to produce the chemical compounds of this invention. I prefer to prepare them by a process which comprises effecting reaction between a diamino $$[(-NHR)_2]$$

mercapto symmetrical triazine (s-triazine) and a hydroxycarbocyclic-carbamyl-alkyl halide (or a hydroxycarbocyclic-thiocarbamyl-alkyl halide) in the presence of a hydrohalide acceptor, e. g., an alkali-metal hydroxide. When the starting components, proportions thereof and reaction conditions are such that the hydrogen atom of the —OH group of the hydroxycarbocyclic compound is replaced by the residue of the hydrohalide acceptor, e. g., by an alkali metal, the hydroxy compound desired as a final product is obtained by treating this intermediate product with hydrochloric, hydrobromic, sulfuric or other suitable organic or inorganic acid in an amount just sufficient to form the desired hydroxy derivative.

Illustrative examples of mercapto diamino s-triazines that may be used, depending upon the particular end-product desired, are:

2-mercapto 4,6-diamino s-triazine (4-mercapto 2,6 diamino s-triazine; 6-mercapto 2,4-diamino s-triazine)
2-mercapto 4-chlorocyclopentylamino 6-toluido s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine
2-mercapto 4-cycloheptylamino 6-isopropylphenylamino s-triazine
2-mercapto 4-isopropylanilino 6-phenylpropylamino s-triazine
2-mercapto 4-dichloroanilino 6-chloroethylamino s-triazine
2-mercapto 4-amino 6-bromoethylamino s-triazine
2-mercapto 4-amino 6-methylamino s-triazine
2-mercapto 4-aminoanilino 6-ethylphenylamino s-triazine
2-mercapto 4-amino 6-benzylamino s-triazine
2-mercapto 4,6-di-(methylamino) s-triazine
2-mercapto 4,6-di-(anilino) s-triazine
2-mercapto 4-amino 6-ethylamino s-triazine
2-mercapto 4,6-di-(propylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-$n$-hexylamino 6-xenylamino 6-naphthylamino s-triazine Illustrative examples of hydroxycarbocyclic carbamyl-alkyl halides and hydroxycarbocyclic-thiocarbamyl-alkyl halides that may be employed, depending upon the particular end-product sought, are:

Para-hydroxyphenyl-carbamyl chloro methane
Alpha - (para - hydroxyphenyl - carbamyl) beta-chloro ethane
Alpha-(meta-hydroxyphenyl-carbamyl) alpha-chloro ethane
Alpha-(para-hydroxyphenyl-thiocarbamyl) alpha-chloro pentane
Ortho-hydroxyphenyl-(methyl)-carbamyl bromo methane
Alpha-(4-hydroxynaphthyl-[1]-carbamyl) beta-chloro butene
Alpha-(para-hydroxy chloro phenyl-carbamyl) alpha-ethyl beta-phenyl beta-bromo ethane
Hydroxytolyl-carbamyl cyclopentyl chloro methane
Hydroxytolyl-(butyl)-carbamyl bromo methane
Para-hydroxyphenyl-(cyclopentyl) - thiocarbamyl chloro methane
Para-hydroxyphenyl - (chloroethyl) - carbamyl chloro methane
4-hydroxycyclohexyl-(phenyl)-carbamyl chloro methane
Alpha-[para-hydroxy chloro phenyl-(bromophenyl)-thiocarbamyl] alpha-chlorocyclohexenyl beta-chloro ethane
3 - hydroxycyclopentyl - carbamyl tolyl chloro methane
Alpha-[4-hydroxy 2-chloro cyclopentyl-(xenyl)-carbamyl] alpha-chloroxylyl beta-chloro ethane
Alpha-(para - hydroxyphenyl - carbamyl) alpha-iodo omega-chloro pentane
Hydroxycyclohexenyl - (phenylisopropyl) - carbamyl chlorocyclopentenyl chloro methane
Alpha-[para - hydroxyxenyl - (isobutylphenyl)-carbamyl] beta-naphthyl beta-bromo ethane
Alpha-[para-hydroxy chloro phenyl-(isopentyl) thiocarbamyl] alpha-ethyl alpha tolyl beta-phenyl beta-bromo propane Various hydrohalide acceptors may be employed. I prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the hydroxycarbocyclic-carbamyl-alkyl halide (or hydroxycarbocyclic-thiocarbamyl-alkyl halide) may be carried out in any suitable manner, but preferably is effected in the presence of a suitable solvent or mixture of solvents. Although various solvents and solvent mixtures may be employed, for economic reasons and because of their eminent suitability I prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures. However, normal pressures and temperatures are preferred for convenience.

The new chemical compounds of this invention also may be prepared by a process which comprises effecting reaction between a halogenated diamino s-triazine and a hydroxycarbonated-carbamyl mercapto alkane (or a hydroxycyclic-carbamyl mercapto alkane or a hydroxycarbocyclic-thiocarbamyl mercapto alkane) in the presence of a hydrohalide acceptor. This reaction preferably is carried out in the presence of an anhydrous solvent. An anhydrous solvent, e. g., alcohol, is desirable because one of the reactants, namely, the halogenated diamino s-triazine is hydrolyzable. The other conditions for preparing the compounds of the invention may be the same as described above with reference to the first-mentioned method of preparation.

Illustrative examples of halogenated diamino s-triazines that may be used, depending on the end-product desired, are:

2-chloro 4,6-diamino s-triazine
2-bromo 4,6-diamino s-triazine
2-iodo 4,6-diamino s-triazine
2-chloro 4,6-di-(methylamino) s-triazine
2-chloro 4,6-di-(anilino) s-triazine
2-bromo 4-amino 6-ethylamino s-triazine
2-chloro 4,6-di-(propylamino) s-triazine
2-bromo 4-allylamino 6-butylamino s-triazine
2-chloro 4-isobutylamino 6-cyclopentylamino s-triazine
2-chloro 4-(3'-butenylamino) 6-isopropylamino s-triazine
2-chloro 4-amylamino 6-cyclohexylamino s-triazine
2-chloro 4-n-hexylamino 6-xenylamino s-triazine
2-bromo 4-cyclohexenylamino 6-naphthylamino s-triazine
2-chloro 4-chlorocyclopentylamino 6-toluido s-triazine
2-chloro 4-bromotoluido 6-benzylamino s-triazine
2-chloro 4-phenylchloroethylamino 6-phenethylamino s-triazine
2-chloro 4-aminoanilino 6-ethylanilino s-triazine
2-chloro 4-chlorocycloheptylamino 6-isopropylphenylamino s-triazine
2-chloro 4-isopropylanilino 6-phenylpropylamino s-triazine
2-bromo 4-dichloroanilino 6-chloroethylamino s-triazine
2-iodo 4-amino 6-bromoethylamino s-triazine Illustrative examples of hydroxycarbocyclic-carbamyl mercapto alkanes and of hydroxycarbocyclic-thiocarbamyl mercapto alkanes that may be used, depending upon the particular end-product desired, are:

Para-hydroxyphenyl-carbamyl mercapto methane
Alpha-(para-hydroxyphenyl-carbamyl) beta-mercapto ethane
Alpha-(meta-hydroxyphenyl-carbamyl) alpha-mercapto ethane
Alpha-(para-hydroxyphenyl-thiocarbamyl) alpha-mercapto pentane
Ortho-hydroxyphenyl-(methyl)-carbamyl mercapto methane
Alpha-(4-hydroxynaphthyl-[1]-carbamyl) beta-mercapto butene
Alpha-(para-hydroxy chloro phenyl-carbamyl) alpha-ethyl beta-phenyl beta-mercapto ethane
Hydroxytolyl-carbamyl-cyclopentyl mercapto methane
Hydroxytolyl-(butyl)-carbamyl mercapto methane
Para-hydroxyphenyl-(cyclopentyl)-thiocarbamyl mercapto methane
Para-hydroxyphenyl-(chloroethyl)-carbamyl mercapto methane
4-hydroxycyclohexyl-(phenyl)-carbamyl mercapto methane
3-hydroxycyclopentyl-carbamyl tolyl mercapto methane
Alpha-[para-hydroxy chlorophenyl-(bromophenyl)-thiocarbamyl] alpha-chlorocyclohexenyl beta-mercapto ethane
Alpha-[hydroxy bromo cyclopentyl-(xenyl)-carbamyl] alpha-(chloroxylyl) beta-mercapto ethane
Alpha-(para-hydroxyphenyl-carbamyl) alpha-mercapto omega-chloro pentane
Hydroxycyclohexenyl-(phenylisopropyl)-carbamyl cyclopentenyl mercapto methane
Alpha-[para-hydroxyxenyl-(butylphenyl)-carbamyl] beta-naphthyl beta-mercapto ethane
Alpha-[para-hydroxy chloro phenyl-(isopentyl)-thiocarbamyl] alpha-ethyl alpha-tolyl beta-phenyl beta-mercapto ethane In order that those skilled in the art better may understand how the present invention may be carried into effect, the following illustrative examples are given. All parts are by weight.

*Example 1*

This example illustrates the preparation of diamino s-triazinyl para-hydroxyphenyl-carbamyl methyl sulfide.

| | Parts |
|---|---|
| Para-(chloroacetamido) phenol | 185 |
| Mercapto diamino s-triazine | 143 |
| Sodium hydroxide | 82 |

The mercapto diamino s-triazine was added to a solution of the sodium hydroxide dissolved in 250 parts water. Stirring was continued until a clear solution resulted. The para-(chloroacetamido) phenol (para-hydroxyphenyl-carbamyl chloro methane) was now added and the mixture was stirred for 1 hour. An additional ten grams of sodium hydroxide was added to the reaction mass in order more quickly to dissolve the mercapto compound. The undissolved solid disappeared almost immediately, indicating complete conversion to the phenolate form. The solution was filtered and the filtered solution then was stirred for 30 minutes. An acid, specifically hydrochloric acid, was added to the clear solution in an amount just sufficient to make the solution neutral to litmus. One hundred and three (103) parts of hydrochloric acid solution containing approximately 38% HCl was sufficient to neutralize the solution. This resulted in the precipitation of a solid comprising diamino s-triazinyl para-hydroxyphenyl-carbamyl-methyl sulfide. The precipitated solid was removed by filtration and washed free from soluble salts. The residue was dried at 70° C. for several hours. The yield of dried product was approximately 92% of the theoretical amount obtainable.

The following equations represent the reactions which are believed to take place:

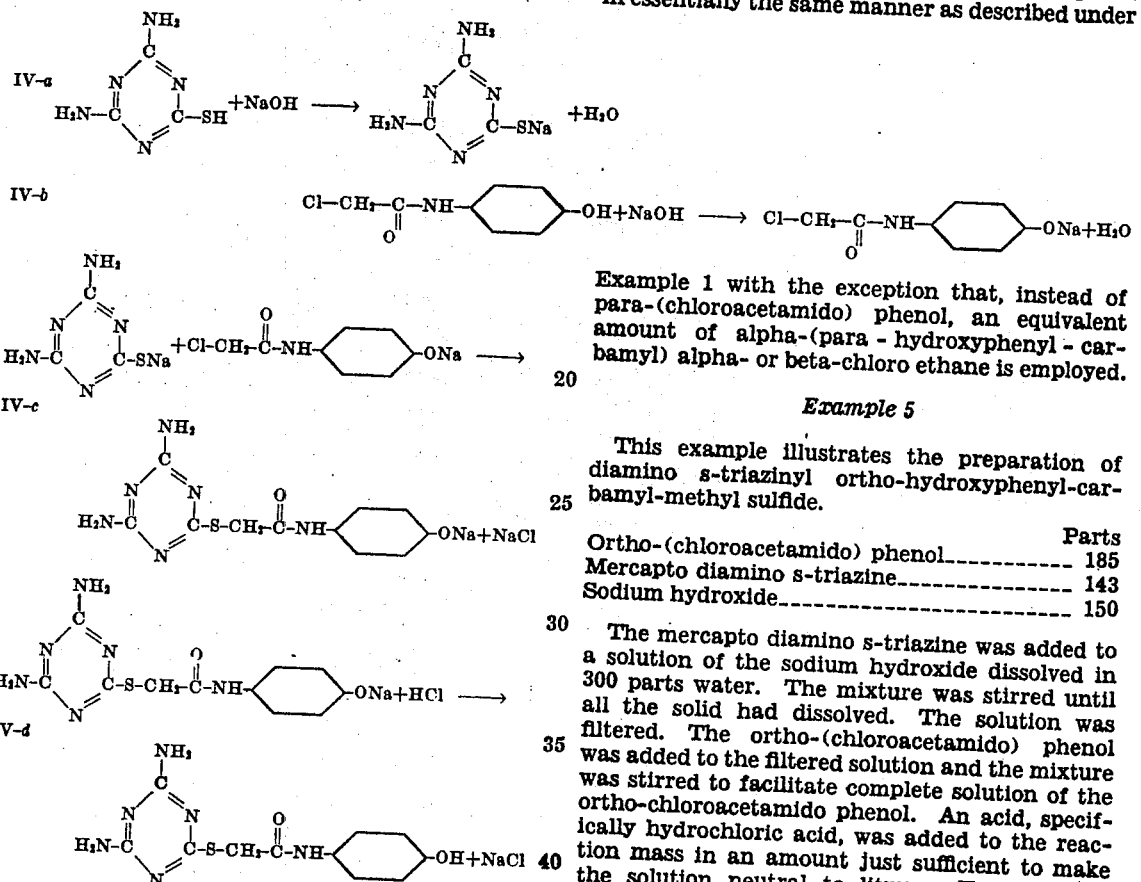

The para-(chloroacetamido) phenol used as a reactant in preparing the compound of this example is a very powerful vesicant. In marked contrast the diamino s-triazinyl para-hydroxyphenyl-carbamyl-methyl sulfide has little or no irritating characteristics.

The diamino s-triazinyl para-hydroxyphenyl-carbamyl-methyl sulfide can be obtained directly, that is, without the acidification step, by using only sufficient sodium hydroxide to form the sodium salt of the mercapto diamino s-triazine as an intermediate product.

Example 2

4,6-di-(methylamino) s-triazinyl-2 para-hydroxyphenyl-carbamyl-methyl sulfide, which also may be named 2,6-di-(methylamino) s-triazinyl-4 para-hydroxyphenyl-carbamyl-methyl sulfide or 2,4-di-(methylamino) s-triazinyl-6 para-hydroxyphenyl-carbamyl-methyl sulfide, is prepared in essentially the same manner as described under Example 1 with the exception that, instead of mercapto diamino s-triazine, an equivalent amount of 2-mercapto 4,6-di-(methylamino) s-triazine is employed.

Example 3

Diamino s-triazinyl para-hydroxytolyl-carbamyl-methyl sulfide is prepared in essentially the same manner as described under Example 1 with the exception that, instead of para-(chloroacetamido) phenol, an equivalent amount of para-hydroxytolyl-carbamyl chloro methane is employed.

Example 4

Diamino s-triazinyl alpha- or beta-(para-hydroxy-phenyl-carbamyl) ethyl sulfide is prepared in essentially the same manner as described under Example 1 with the exception that, instead of para-(chloroacetamido) phenol, an equivalent amount of alpha-(para-hydroxyphenyl-carbamyl) alpha- or beta-chloro ethane is employed.

Example 5

This example illustrates the preparation of diamino s-triazinyl ortho-hydroxyphenyl-carbamyl-methyl sulfide.

| | Parts |
|---|---|
| Ortho-(chloroacetamido) phenol | 185 |
| Mercapto diamino s-triazine | 143 |
| Sodium hydroxide | 150 |

The mercapto diamino s-triazine was added to a solution of the sodium hydroxide dissolved in 300 parts water. The mixture was stirred until all the solid had dissolved. The solution was filtered. The ortho-(chloroacetamido) phenol was added to the filtered solution and the mixture was stirred to facilitate complete solution of the ortho-chloroacetamido phenol. An acid, specifically hydrochloric acid, was added to the reaction mass in an amount just sufficient to make the solution neutral to litmus. Two hundred and thirty-eight (238) parts of aqueous hydrochloric acid containing approximately 38% HCl was sufficient to neutralize the solution. This resulted in the precipitation of a solid comprising diamino s-triazinyl ortho-hydroxyphenyl-carbamyl-methyl sulfide. The precipitated solid was removed by filtration and washed until all soluble salts had been extracted. The residue was dried at 70° C. for several hours to obtain the purified diamino s-triazinyl ortho-hydroxyphenyl-carbamyl-methyl sulfide. The compound of this example, like the product of Example 1, lacked the vesicant characteristics of the ortho-(chloroacetamido) phenol from which it was prepared.

The diamino s-triazinyl ortho-hydroxyphenyl-carbamyl-methyl sulfide can be obtained directly, that is, without the acidification step, by using only sufficient sodium hydroxide to form the sodium salt of the mercapto diamino s-triazine as an intermediate product.

Illustrative examples of other compounds of this invention, and which may be prepared as hereinbefore described, are:

Diamino s-triazinyl meta-hydroxyphenyl-carbamyl-methyl sulfide 4,6 - di - (methylamino) s-triazinyl-2 ortho-hydroxyphenyl-carbamyl-methyl sulfide 4,6 - di - (methylamino) s-triazinyl-2 meta-hydroxyphenyl-carbamyl-methyl sulfide Diamino s-triazinyl ortho-hydroxyphenyl-thiocarbamyl-methyl sulfide Diamino s-triazinyl meta-hydroxyphenyl-thiocarbamyl-methyl sulfide Diamino s-triazinyl para-hydroxyphenyl-thiocarbamyl-methyl sulfide
4,6 - di - (methylamino) s-triazinyl-2 ortho-hydroxyphenyl-thiocarbamyl-methyl sulfide
4,6 - di - (methylamino) s-triazinyl-2 meta-hydroxyphenyl-thiocarbamyl-methyl sulfide
4,6 - di - (methylamino) s-triazinyl-2 para-hydroxyphenyl-thiocarbamyl-methyl sulfide
Diamino s-triazinyl ortho-hydroxytolyl-carbamyl-methyl sulfide
Diamino s-triazinyl meta-hydroxytolyl-carbamyl-methyl sulfide
Diamino s-triazinyl ortho-hydroxytolyl-thiocarbamyl-methyl sulfide
Diamino s-triazinyl meta-hydroxytolyl-thiocarbamyl-methyl sulfide
Diamino s-triazinyl para-hydroxytolyl-thiocarbamyl-methyl sulfide
4,6 - di - (methylamino (s-triazinyl-2 ortho-hydroxytolyl-carbamyl-methyl sulfide
4,6 - di - (methylamino) s-triazinyl-2 meta-hydroxytolyl-carbamyl-methyl sulfide
4,6 - di - (methylamino) s-triazinyl-2 para-hydroxytolyl-carbamyl-methyl sulfide
Diamino s-triazinyl alpha-(ortho-hydroxyphenyl-carbamyl-ethyl) sulfide
Diamino s-triazinyl alpha-(meta-hydroxyphenyl-carbamyl-ethyl) sulfide
Diamino s-triazinyl beta-(ortho-hydroxyphenyl-carbamyl-ethyl) sulfide
Diamino s-triazinyl beta-(meta-hydroxyphenyl-carbamyl-ethyl) sulfide
Diamino s-triazinyl alpha-(ortho-hydroxyphenyl-thiocarbamyl-ethyl) sulfide
Diamino s-triazinyl alpha-(meta-hydroxyphenyl-thiocarbamyl-ethyl) sulfide
Diamino s-triazinyl alpha-(para-hydroxyphenyl-thiocarbamyl-ethyl) sulfide
Diamino s-triazinyl beta-(ortho-hydroxyphenyl-thiocarbamyl-ethyl) sulfide
Diamino s-triazinyl beta-(meta-hydroxyphenyl-thiocarbamyl-ethyl) sulfide
Diamino s-triazinyl beta-(para-hydroxyphenyl-thiocarbamyl-ethyl) sulfide
Diamino s-triazinyl alpha-(ortho-hydroxytolyl-carbamyl-ethyl) sulfide
Diamino s-triazinyl alpha-(meta-hydroxytolyl-carbamyl-ethyl) sulfide
Diamino s-triazinyl alpha-(para-hydroxytolyl-carbamyl-ethyl) sulfide
Diamino s-triazinyl beta-(ortho-hydroxytolyl-carbamyl-ethyl) sulfide
Diamino s-triazinyl beta-(meta-hydroxytolyl-carbamyl-ethyl) sulfide
Diamino s-triazinyl beta-(para-hydroxytolyl-carbamyl-ethyl) sulfide
Diamino s-triazinyl alpha-(ortho-hydroxytolyl-thiocarbamyl-ethyl) sulfide
Diamino s-triazinyl alpha-(meta-hydroxytolyl-thiocarbamyl-ethyl) sulfide
Diamino s-triazinyl alpha-(para-hydroxytolyl-thiocarbamyl-ethyl) sulfide
Diamino s-triazinyl beta-(ortho-hydroxytolyl-thiocarbamyl-ethyl) sulfide
Diamino s-triazinyl beta-(meta-hydroxytolyl-thiocarbamyl-ethyl) sulfide
Diamino s-triazinyl beta-(para-hydroxytolyl-thiocarbamyl-ethyl) sulfide
4,6-di-(anilino) s-triazinyl-2 alpha-(meta-hydroxyphenyl-carbamylethyl) sulfide
4-ethylamino 6-amino s-triazinyl-2 alpha-(para-hydroxyphenyl-thiocarbamyl-pentyl) sulfide
4,6-di-(propylamino) s-triazinyl-2 ortho-hydroxyphenyl-(methyl)-carbamyl - methyl sulfide
4-(3'-butenylamino) 6-isopropylamino s-triazinyl-2 hydroxytolyl - carbamyl - (cyclopentyl) - methyl sulfide
4-pentylamino 6-cyclohexylamino s-triazinyl-2 para - hydroxyphenyl-(cyclopentyl) -thiocarbamyl-methyl sulfide
4-n-hexylamino 6-xenylamino s-triazinyl-2 para-hydroxyphenyl - (isobutyl) - carbamyl-methyl sulfide
4-cyclohexenylamino 6-naphthylamino s-triazinyl-2 para-hydroxyphenyl-(chloroethyl)-carbamyl-methyl sulfide
4-chlorocyclopentylamino 6-toluido s-triazinyl-2 hydroxycyclohexyl - (phenyl) - carbamyl-methyl sulfide
4-bromotoluido 6-benzylamino s-triazinyl-2 hydroxycyclopentyl-carbamyl-(tolyl) -methyl sulfide
4-phenylchloroethylamino 6-phenethylamino s-triazinyl-2 beta-[para-hydroxy chloro phenyl-(bromophenyl)-thiocarbamyl-(beta-chlorocyclohexenyl)-ethyl] sulfide
4-isobutylamino 6-cyclopentylamino s-triazinyl-2 beta-[para-hydroxy chloro phenyl-carbamyl-(alpha-phenyl beta-ethyl)-ethyl] sulfide
4-dichloroanilino 6-chloroethylamino s-triazinyl-2 beta-[para-hydroxyxenyl-(isobutylphenyl)-carbamyl-(alpha-naphthyl)-ethyl] sulfide
4-bromoethylamino 6-amino s-triazinyl-2 beta-[para-hydroxy chloro phenyl-(isopentyl)-thiocarbamyl - (alpha - methyl beta - ethyl beta-tolyl)-ethyl] sulfide In a manner similar to that described above with particular reference to the diamino $$[(-NHR)_2]$$

s-triazinyl hydroxycarbocyclic - carbamyl - alkyl sulfides, corresponding derivatives of the asymmetrical and vicinal triazines may be prepared. It also will be understood from the foregoing description of a triazine monosulfide that similar compounds may be prepared in which two or three sulfur atoms are attached directly to a carbon atom of the triazine nucleus, thus:

It also will be apparent to those skilled in the art that both the triazinyl mono- and poly-hydroxy (e. g., di-hydroxy, tri-hydroxy) carbocyclic-carbamyl- and thiocarbamyl-methyl and -ethyl sulfides may be produced as herein described.

What I claim as new and desire to secure by Letters Patent of the United States is:

1. Chemical compounds corresponding to the general formula where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

2. Chemical compounds as in claim 1 wherein R represents hydrogen.

3. Chemical compounds as in claim 1 wherein R represents hydrogen, Z represents a member of the class consisting of oxygen and sulfur, and $n$ is 1.

4. Chemical compounds corresponding to the general formula

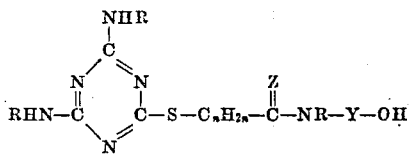

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

5. Chemical compounds corresponding to the general formula

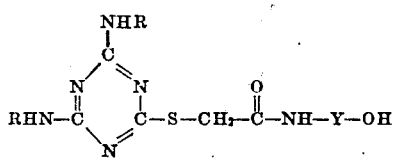

where Y represents a divalent carbocyclic radical, and R represents a member of the class consisting of hydrogen and monovalent hydrocarbon and halo-hydrocarbon radicals.

6. A diamino s-triazinyl hydroxycarbocyclic-carbamyl-methyl sulfide.

7. A diamino s-triazinyl hydroxyphenyl-carbamyl-methyl sulfide.

8. Diamino s-triazinyl ortho-hydroxyphenyl-carbamyl-methyl sulfide.

9. Diamino s-triazinyl para-hydroxyphenyl-carbamyl-methyl sulfide.

10. A diamino s-triazinyl hydroxytolyl-carbamyl-methyl sulfide.

11. The method of preparing chemical compounds corresponding to the general formula

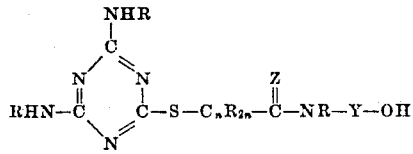

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals, said method comprising effecting reaction, in the presence of a hydrohalide acceptor, between (1) a mercapto triazine corresponding to the general formula

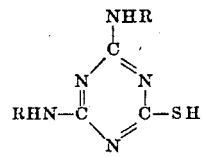

where R has the meaning above given, and (2) a halide corresponding to the general formula

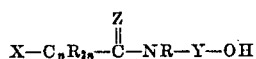

where X represents halogen, and $n$, Z, Y and R have the meanings above given.

12. A method as in claim 11 wherein the hydrohalide acceptor is an alkali-metal hydroxide.

13. The method of preparing a diamino s-triazinyl hydroxyphenyl-carbamyl-methyl sulfide which comprises effecting reaction, in the presence of a hydrohalide acceptor, between thioammeline and a chloroacetamido phenol.

14. The method of preparing diamino s-triazinyl para-hydroxyphenyl-carbamyl-methyl sulfide which comprises effecting reaction, in the presence of an alkali-metal hydroxide, between thioammeline and para-(chloroacetamido) phenol.

15. The method of preparing diamino s-triazinyl ortho-hydroxyphenyl-carbamyl-methyl sulfide which comprises effecting reaction, in the presence of an alkali-metal hydroxide, between thioammeline and ortho-(chloroacetamido) phenol.

GAETANO F. D'ALELIO.